United States Patent [19]
Schoenwald et al.

[11] Patent Number: 5,757,994
[45] Date of Patent: *May 26, 1998

[54] THREE-PART OPTICAL COUPLER

[75] Inventors: Jeffrey S. Schoenwald, Thousand Oaks; Stephen W. Clausi; James L. Peck, Jr., both of Huntington Beach, all of Calif.

[73] Assignee: Boeing North American, Inc., Seal Beach, Calif.

[*] Notice: The term of this patent shall not extend beyond the expiration date of Pat. No. 5,666,448.

[21] Appl. No.: 532,195

[22] Filed: Sep. 22, 1995

[51] Int. Cl.$^6$ .................................................. G02B 6/26
[52] U.S. Cl. .......................... 385/44; 385/19; 385/34; 385/36; 359/636
[58] Field of Search ........................ 385/44, 19, 31, 385/32, 33, 34, 35, 36; 359/636

[56] References Cited

U.S. PATENT DOCUMENTS

| | | | |
|---|---|---|---|
| 3,870,396 | 3/1975 | Racki et al. | 350/96 |
| 3,883,217 | 5/1975 | Love et al. | 350/96 |
| 3,901,582 | 8/1975 | Milton | 385/44 |
| 4,078,852 | 3/1978 | Lebduska | 385/44 |
| 4,130,345 | 12/1978 | Doellner | 350/96.22 |
| 4,173,390 | 11/1979 | Kach | 350/96.16 |
| 4,176,908 | 12/1979 | Wagner | 350/96.15 |
| 4,262,995 | 4/1981 | Tangonan | 350/96.16 |
| 4,525,025 | 6/1985 | Hohmann et al. | 350/96.15 |
| 5,037,172 | 8/1991 | Hekman et al. | 385/31 |
| 5,071,213 | 12/1991 | Chan | 385/52 |
| 5,282,257 | 1/1994 | Ota | 385/46 |
| 5,285,305 | 2/1994 | Cohen et al. | 359/110 |
| 5,286,129 | 2/1994 | French et al. | 403/127 |

*Primary Examiner*—Phan T. H. Palmer
*Attorney, Agent, or Firm*—Lawrence N. Ginsberg; Charles T. Silberberg

[57] ABSTRACT

The optical coupler includes first, second and third port assemblies and a deflecting element. The first port assembly receives a first optical signal, the first port assembly including a first lensing element. The second port assembly emits a predetermined, transmitted portion of the first optical signal. The second port assembly includes a second lensing element. The deflecting element is positioned between the first and second port assemblies. The third port assembly includes a third lensing element. The deflecting element and the third port assembly are so positioned and arranged such that a deflected portion of the first optical signal is deflected from the deflecting element and directed through the third port assembly. The predetermined, transmitted portion of the first optical signal is directed through the second port assembly without being deflected by the deflecting element. The transmitted and deflected portions of the first optical signal are expanded and collimated while passing through the optical coupler by appropriate positioning of the lensing elements to provide efficient and accurate control of the first optical signal.

11 Claims, 6 Drawing Sheets

THREE-PART OPTICAL COUPLER

BACKGROUND OF THE INVENTION

1. Field of the Invention

This invention relates to optical coupling technology and more particularly to the use of a deflecting element to passively couple fiber optic signals.

2. Description of the Related Art

Embodiments of what are conventionally referred to as optical T-couplers have been previously described in which light guiding glass cores are employed to facilitate coupling between and among several optical fiber channels. For example, U.S. Pat. No. 3,883,217, issued to Love et al., discloses a system employing a glass core light guide to interface opposing bundles of fibers. The light guide length is chosen to insure that light from any one incoming fiber is distributed across the entire aperture of the guide so that the entire receiving bundle is illuminated and data transmitted on all outgoing fibers. This also facilitates the multiplexing of several optical signals onto all outgoing fiber channels simultaneously, which may or may not be desirable, depending on the application. Problems arise in the complexity, component count and manufacturability of the device.

In U.S. Pat. No. 3,870,396, issued to Racki et al., right angle isosceles glass prisms are interposed between terminated bundles of fibers to provide for partial reflection and transmission. Transition light guides, which reduce the cross-sectional area of the device to match the geometry of the fiber bundle are subject to radiative loss.

In U.S. Pat. No. 4,176,908, issued to R. E. Wagner, the concept of a v-shaped groove or notch formed in the light guide is introduced to provide for internal reflection of the beam at substantially 90 degrees to the direction of primary light propagation for the purpose of directing light to a branch port of similar light guiding medium so as to direct a fraction of the total optical power toward the branch, roughly in proportion to the fraction of light guide cross-sectional area occluded by the V-shaped groove.

In the aforementioned disclosures the optical light guides are apparently intended to interface with either bundles of fibers, or appropriate light sources or detectors, such as laser diodes, light emitting diodes or optical photodetectors. The above disclosures are primarily concerned with multi channel distribution of light signals to or between bundles of fibers. This approach has inherent drawbacks due to low power efficiency of distribution into any single fiber channel.

U.S. Pat. No. 4,130,345, issued to O. L. Doellner, discloses the use of single optical fibers in the construction of wedge-shaped building blocks that must be formed, polished, coated with dielectric layers (to facilitate controlled through-transmission and reflection at 90 degrees to the incident direction), and must be aligned and bonded with precision corresponding to the alignment requirements of single or multimode fibers. The use of relatively large diameter glass rods for beam mixing, with respect to the '396 and '908 disclosures mentioned above, is deficient because the reflections from surfaces large in comparison to the wavelength can gibe rise to time delayed "ghost" signals due to multiple reflections at the light guide end surfaces, but dielectric antireflection coatings can significantly reduce this problem, and is, in fact, a common practice. Problems arise concerning the cost of reliably manufacturing such complex coupling devices as described in U.S. Pat. No. 4,130,345. At the time of that invention, multimode fiber was most commonly in use, and the invention would be more tolerant of alignment errors for such fibers than for singlemode fibers. Furthermore, the inventor bases advantages of his invention on incorrectly comparing the outer diameter of typical multimode fibers—125 micrometers (0.005 inches), which is the same for singlemode fibers—to the core diameter of singlemode fibers, typically 10 micrometers or less. The inventor makes no distinction between the fiber diameter and the core diameter. In fact, most standard multimode fibers have core diameters of 50–100 micrometers (0.002–0.004 inches), and are sheathed with an outer glass cladding that is usually approximately the same for both types of fibers to facilitate standard connectorization.

These types of couplers are all variants of a bulk wave beam splitter. Another form of coupler is the fused fiber coupler. In this device, two or more fibers are twisted together and heated while axial tension is applied. As the glass of the fibers softens, the optical cores are brought into close enough proximity that light can transfer from one fiber to the other(s). Such devices are reliable, however, they are usually are relatively expensive to manufacture, and function within specifications over a limited range of optical wavelength, because the rate of power transfer depends on the ratio of optical wavelength to physical separation distance between cores of adjacent fibers.

There are no optical lensing elements disclosed in the aforementioned prior art. Clearly it is an advantage to reduce the component complexity in light of prevailing technology. However, the advent of diffractive optics, microlens and gradient index lens technology provides the basis for the development of optical T-couplers, as will be disclosed below, that can easily and efficiently interface single fibers, whether singlemode or multimode, permitting more flexibility in designing optical fiber networks.

OBJECTS AND SUMMARY OF THE INVENTION

Accordingly, it is principal object of this invention to provide an optical coupling apparatus of improved efficiency, of minimum complexity and simple construction, wherein minimum perturbation occurs in the propagation of light energy through the coupling apparatus as a component of an optical network, especially networks using optical fibers.

It is another object of the invention to provide an optical T-coupler of simple design, easily manufactured and easily applied which permits efficient and passive optical coupling between individual optical fibers, optical sources and optical detectors, such as are used in optical fiber networks.

These and other objects are achieved by introducing light into one port of the coupler, whether from an optical fiber or an optical source, such as a light emitting diode (LED) or laser diode (LD), and by emitting light from other ports of the coupler, into either optical fibers or photodetectors. The coupler ports include appropriate lensing elements, such as microlenses or gradient index lenses to properly match the étendue of the light source, detector or fiber to that of the light guide of the coupler. A principal function of the lensing system is to insure that the light beam within the coupler portion of the device is substantially a plane-wave collimated beam expanded to the extent that it fills the cross-section of the light guide. The main body of the coupler, apart from the lensing elements, comprises, in at least one or more embodiments, a solid transparent light guide with a deflecting element imbedded within, such as a V-groove, to excise and redirect a portion of the transmitted light to a port other than the unexcised portion of the beam of light. It is convenient to assume for the sake of discussion that the deflecting element has a reflecting surface that diverts a portion of the beam at 90 degrees to the initial direction. Having the beam within the light guide be collimated results in a great simplification of the design of components and analysis of optical propagation. The deflecting element can be formed in various configurations, so as to make the device behave in a directional (non-reciprocal) or bi-directional (reciprocal) manner with regard to the transmission of light.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENT

Figure 1:
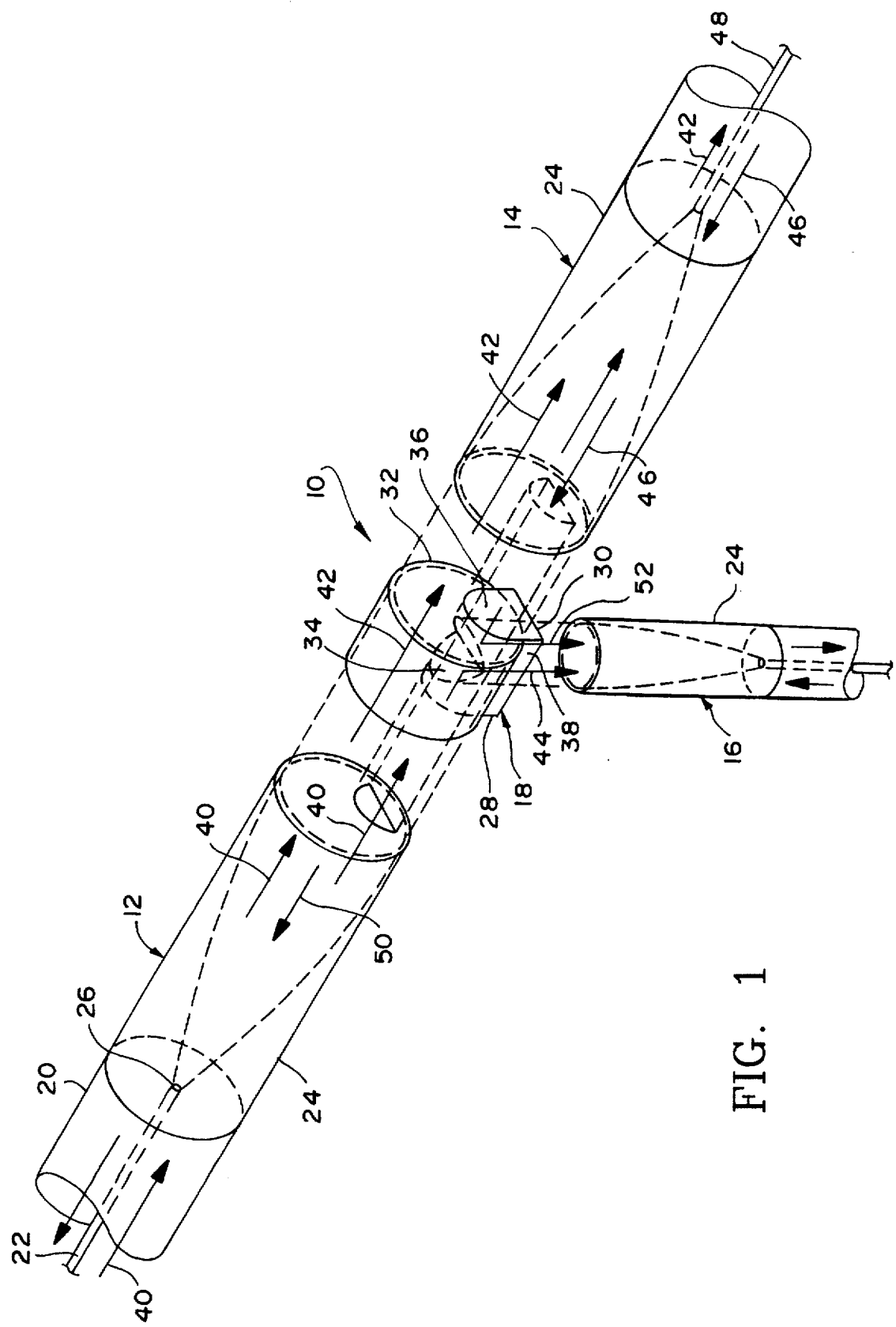
FIG. 1 is an exploded perspective view of a preferred embodiment of the present invention in which bi-directional coupling and splitting of optical signals is achieved.

Referring now to the drawings and the characters of reference marked thereon, FIG. 1 illustrates a preferred embodiment of the present invention in which bi-directional coupling and splitting of the optical signals is achieved, this embodiment being designated generally as 10. Optical coupler 10 includes a first port assembly 12, a second port assembly 14, a third port assembly 16 and a deflecting element assembly 18. The first port assembly 12 includes a ferrule 20 for aligning a fiber optic cable 22 concentrically. The ferrule 20 positions the fiber optic cable 22 with respect to a lens 24. The fiber optic cable 22 provides connection to an optical data bus (not shown). Lensing element 24 may comprise, for example, a gradient index (GRIN) lens or a single or multi-lens assembly. The lensing element 24 expands and collimates light emerging from the fiber optic cable 22. Reciprocally, a collimated optical beam will be compressed and focused into the aperture 26 of the fiber optic cable 22. In the instance where a GRIN lens is used, the components of the port assembly 12 may be bonded with appropriate, conventional optical adhesives. Alternatively, where the lensing element 24 comprises one or more classical lenses, the assembly 12 may be physically assembled within a mechanical housing to position and align the elements as desired. The above discussion regarding port assembly 12 applies equally to the second port assembly 14 and third port assembly 16.

The deflecting element assembly 18 includes two deflecting elements 28, 30 and a retention member 32. Each deflecting element, 28, 30 includes an angled, deflecting surface 34 to cause internal reflection and redirection of an incident light beam. Orthogonal faces 36, 38 provide transmission into and out of the deflecting element assembly 18. The deflecting elements 28, 30 may be formed of glass or other suitable optically transmitting media.

The retention member 32 may be formed of glass or other suitable optical medium. The retention member 32 serves as a transmission medium for the optical signal and also serves to position the deflecting elements 28, 30. In operation, for example, the first port assembly 12 receives a first optical signal 40 from the fiber optic cable 22. The optical signal 40 is expanded and collimated as it passes through the lensing element 24. The second port assembly 14 emits a predetermined transmitted portion 42 of the first optical signal 40. The deflecting element 28 and third port assembly 16 are positioned such that a deflected portion 44 of the first optical signal 40 is deflected from the deflecting element assembly 18 and directed through the third port assembly 16. The transmitted portion 42 and deflected portion 44 of the first optical signal 40 are expanded and collimated while passing through the optical coupler 10 by appropriate positioning of the lensing elements 24 to provide efficient and accurate control of the first optical signal 40.

This embodiment 10 is bi-directional, that is, a second optical signal 46 may be transmitted through the opposing fiber optic cable 48 and be expanded and collimated by the lensing element 24 within the second port assembly 14. A first transmitted portion 50 of the second optical signal 46 is directed through the first port assembly 12 and the second, deflected portion 52 of the second optical signal 46 is directed through the third port assembly 16.

Thus, it can be seen that by using expanded and collimated optical beams, the transmission and splitting of optical signals can be accomplished with high efficiency. Unlike prior art devices such as disclosed in U.S. Pat. No. 3,883,217, which utilize bundles of fibers and a volumetric mixing region, the present invention does not suffer from the inefficiency associated with the loss of signal due to the ratio of optical apertures of the bundled fibers to the total cross-sectional area of the bundled fibers, which consist of core and cladding regions.

Furthermore, unlike U.S. Pat. No. 4,173,390, which contains no use of lensing elements, the use of lensing elements for collimating and focusing described in the present invention improves the efficiency of optical transmission and coupling.

Figure 2:
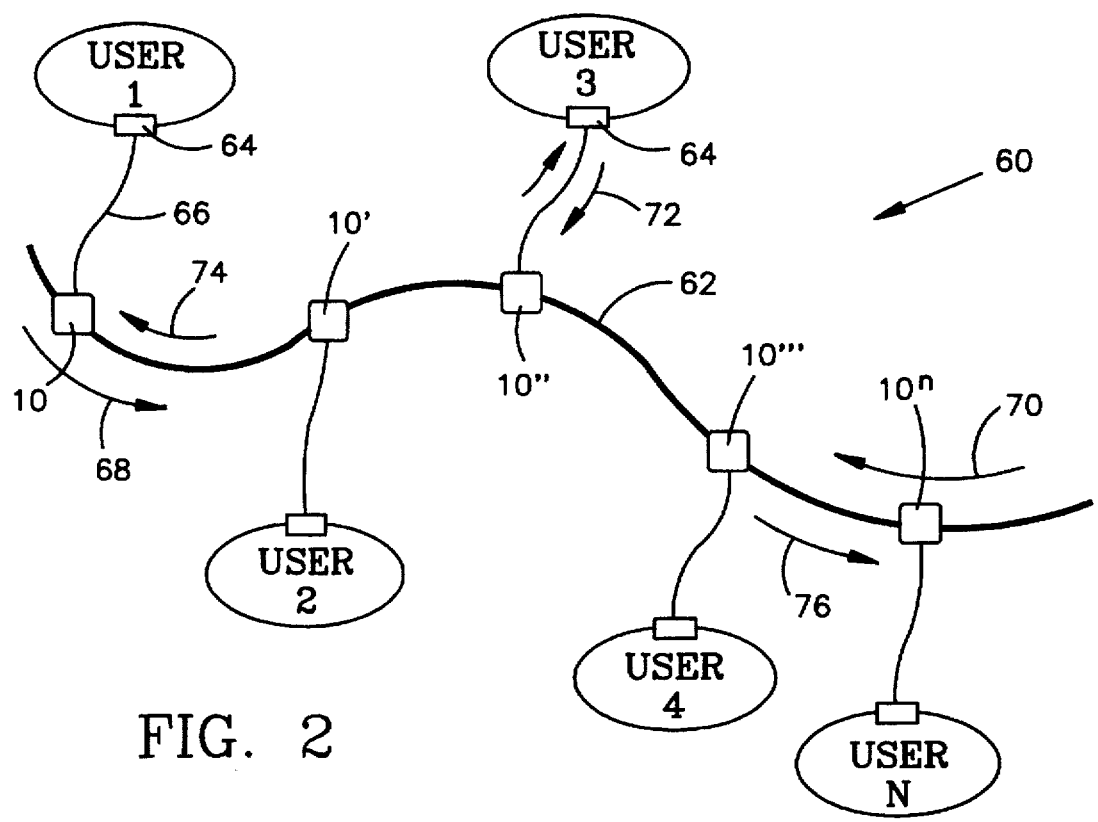
FIG. 2 is a schematic illustration of an optical data bus incorporating the optical coupler of the present invention, wherein a plurality of data users are connected to the bus and use the bus for bi-directional communication.

Referring now to FIG. 2, it may be seen how a number of optical couplers 10 may be utilized in an optical data network, designated generally as 60. Network 60 includes a fiber optic data bus 62. A user 64 is connected to the data bus 62 via a branch fiber optic cable 66 connected via optical coupler 10. Any signal 68 that propagates down the bus 62 may be accessed by all users 64 on the bus 62. Another optical signal 70 propagating down the optical data network 60 in the reverse direction can similarly be accessed by all users 64. Furthermore, any user 64 can originate a signal 72, which can be propagated bi-directionally, as shown by arrows 74 and 76. All users can, therefore, directly communicate with any other user on this optical data network 60, eliminating the need for active nodes.

Figure 3:
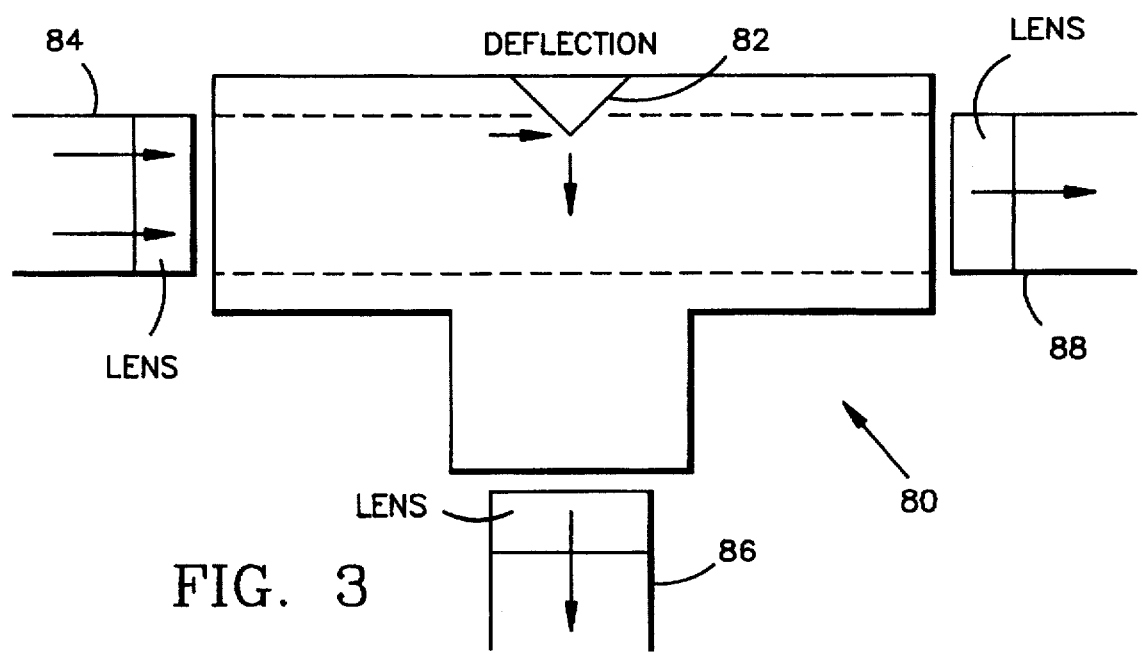
FIG. 3 is a functional, schematic diagram of an embodiment of the optical coupler utilizing a deflecting element providing bi-directional coupling.
Figure 4:
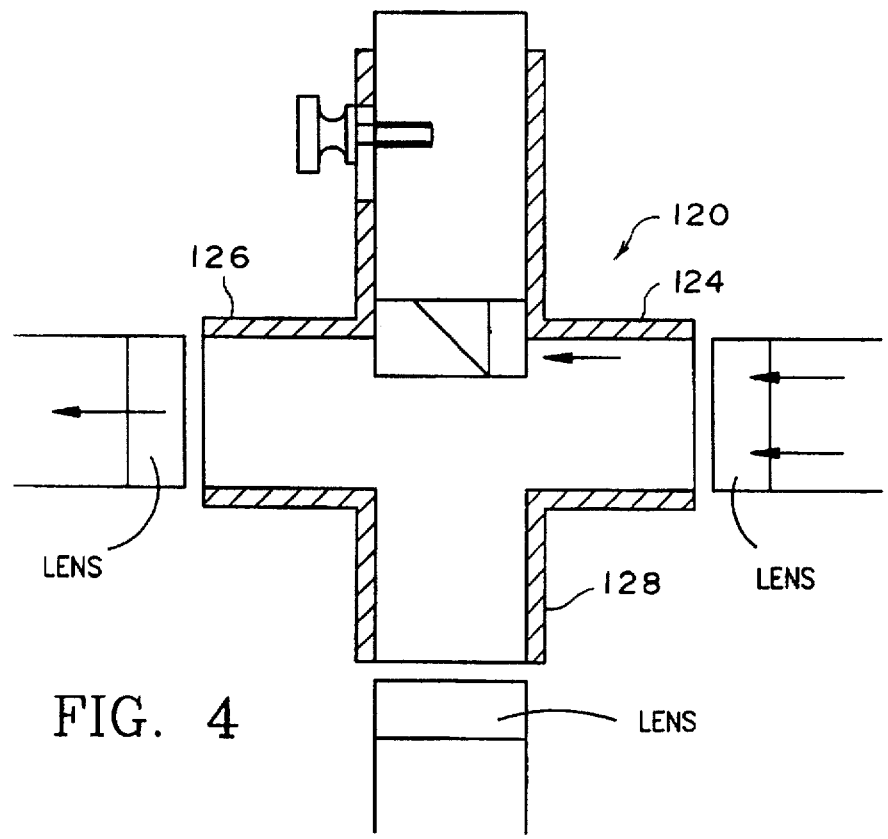
FIG. 4 is a functional, schematic diagram of an embodiment of the optical coupler utilizing a deflecting element providing uni-directional coupling between two inline ports.
Figure 5:
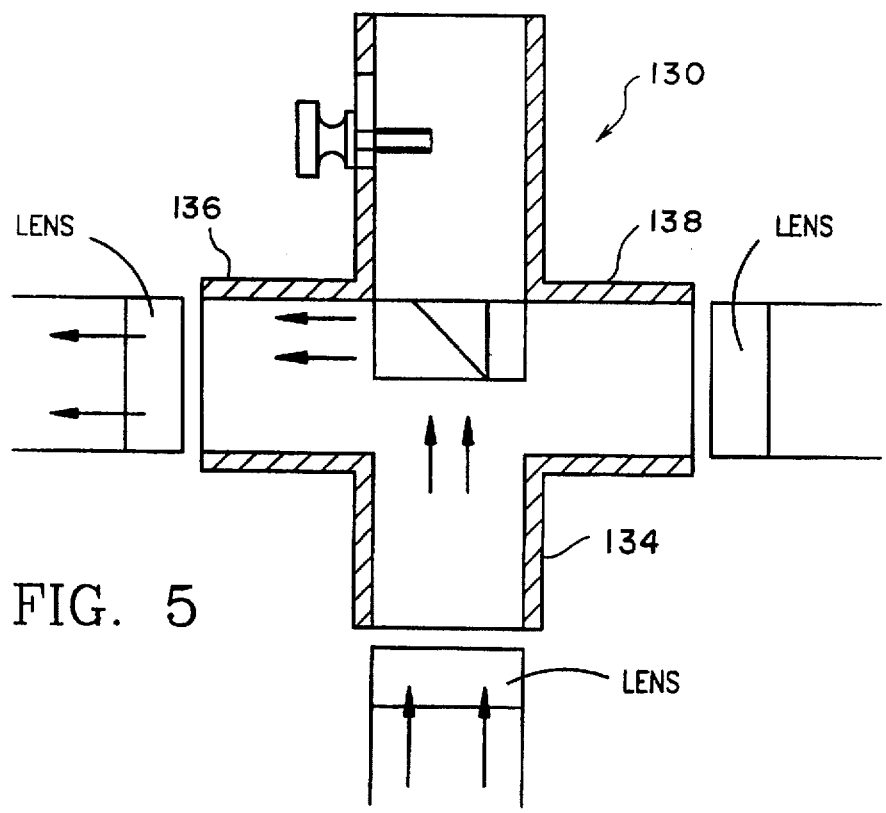
FIG. 5 is a functional, schematic diagram of an embodiment to the optical couple utilizing a deflecting element providing uni-directional coupling between a perpendicular port and an inline port.

Referring now to FIGS. 3–8, it can be seen that by changing the details of the deflecting element geometry, the principles of the present invention can be used to obtain various degrees of coupling and directionality. FIGS. 3, 6–8 describe various combinations of optical beam propagation through the optical coupler given that the deflecting element is designed for bi-directional operation. FIGS. 4–5 describe unidirectional operation for the indicated design of the deflecting element.

FIG. 3 represents an optical coupler, designated generally as 80, which utilizes a bi-directional deflecting element 82. This figure illustrates the properties of beam distribution for light received at optical port 84 and its coupling to optical ports 86, 88.

Figure 6:
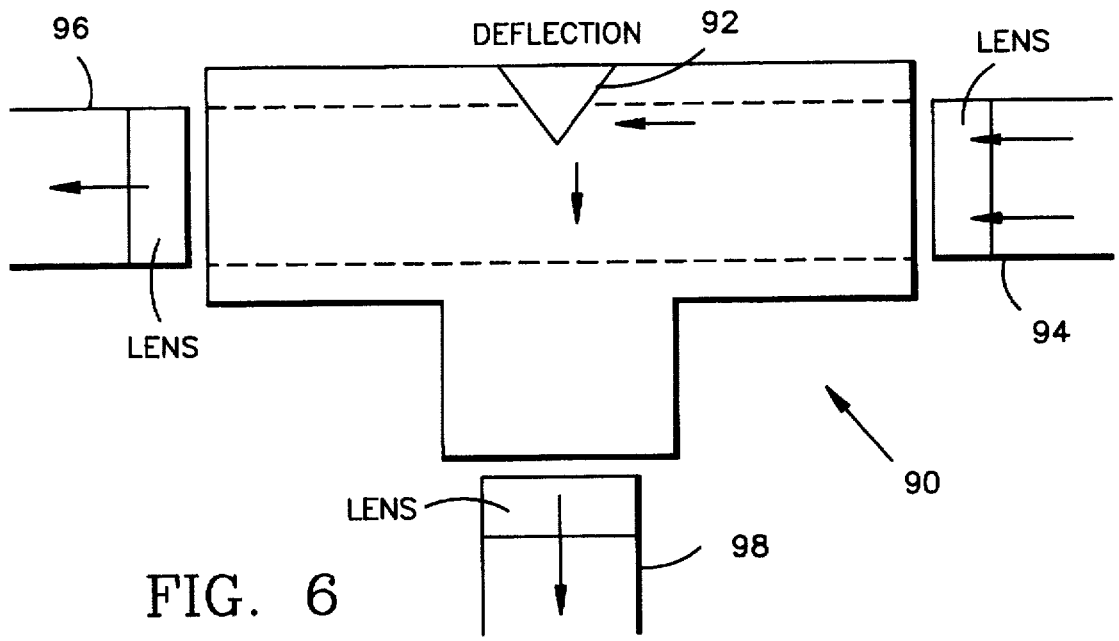
FIG. 6 is a functional, schematic diagram of an embodiment to the optical coupler utilizing a deflecting element providing bi-directional coupling between either an inline port or a perpendicular port.

Similarly, FIG. 6 illustrates an optical coupler, designated generally as 90, also using a bi-directional deflecting element 92.

In this example, light is received at optical port 94 and is coupled to both ports 96, 98, by means of the bi-directional element 92. Comparison of FIGS. 3 and 6 illustrates the bi-directional properties of the present invention.

Figure 7:
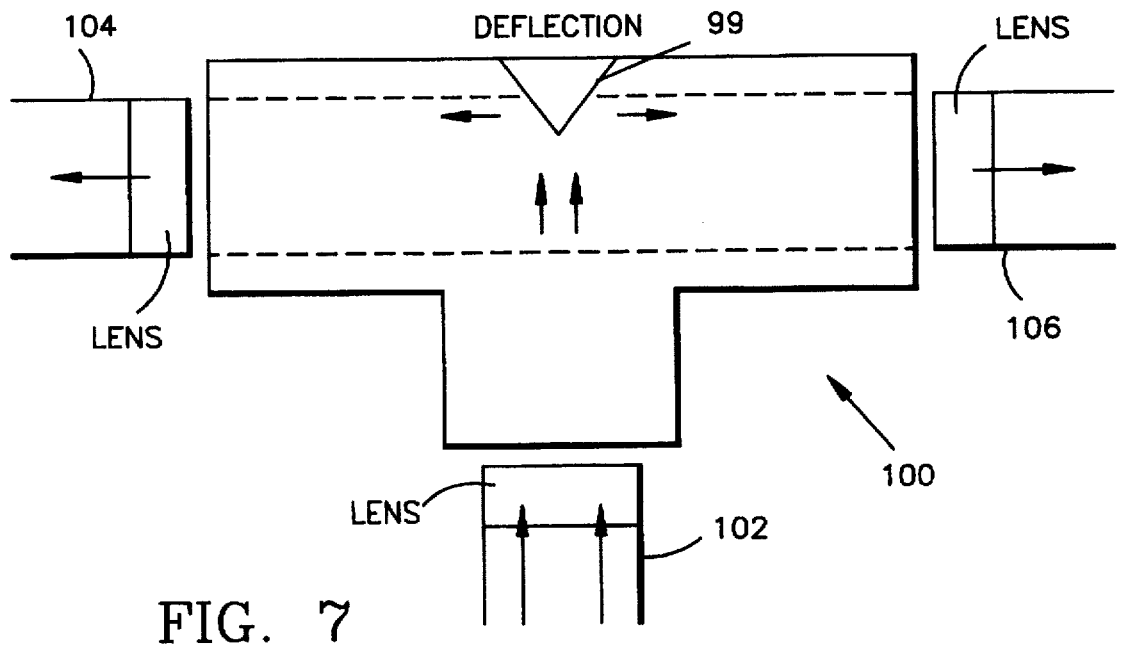
FIG. 7 is a functional, schematic diagram of an embodiment to the optical coupler utilizing a deflecting element providing bi-directional coupling between a perpendicular port and two inline ports.

FIG. 7 further illustrates the bi-directionality of the present invention using a bi-directional deflecting element 99, this embodiment being designated generally as 100. Light entering at optical port 102 is deflected by deflecting element 99 to ports 104, 106.

Figure 8:
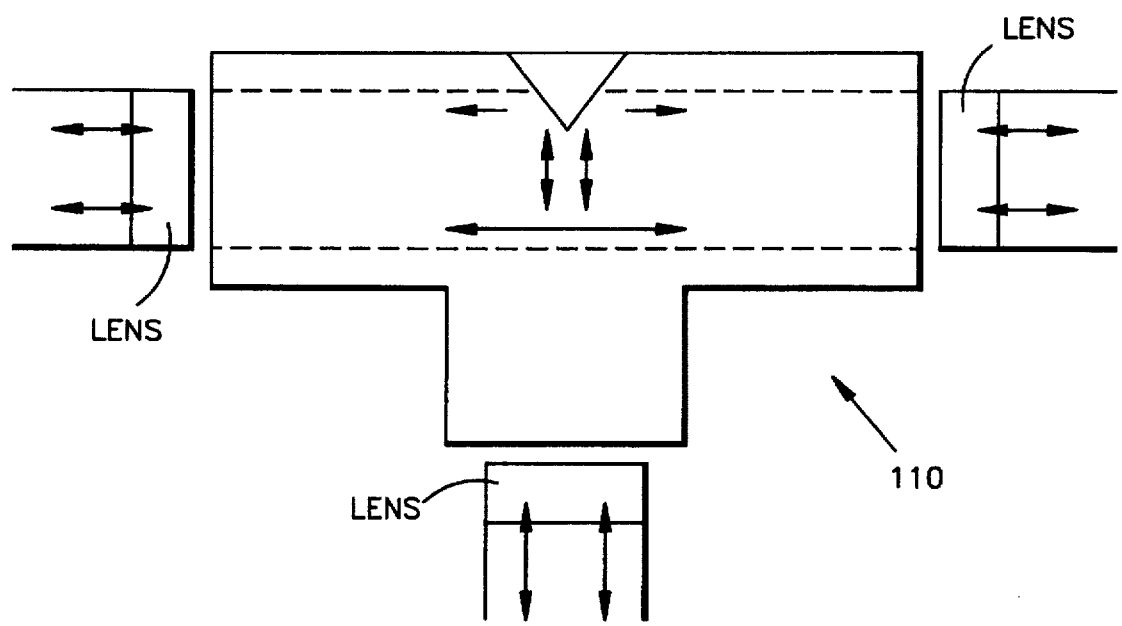
FIG. 8 is a functional, schematic diagram of an embodiment of the optical coupler utilizing a deflecting element providing bi-directional coupling between all ports.

FIG. 8, illustrates an optical coupler designated 110, in which light entering any port is coupled to each of the other ports regardless of the direction of transmission.

Referring now to FIG. 4, an optical coupler designated generally as 120, includes a deflecting element 122 possessing uni-directional optical properties as discussed below. Light entering at the second port 124 is transmitted only to the first optical port 126. There is a certain degree of optical attenuation because of the construction of the deflecting element. However, no light will be deflected to the third optical port 128.

Referring now to FIG. 5, another optical coupler is shown, designated generally as 130. The optical deflecting element 132 is uni-directional, as in the previous embodiment, discussed above with respect to FIG. 4. Light received at the third port 134 is deflected and coupled to the first port 136. However, no light is received at the second port 138.

It is understood that any optical fiber in the previous embodiment may be replaced directly by an optical source or detector. This may limit the bi-directional properties of the coupler as implemented with optical fibers.

It is understood that optical signals may be received from fiber optic cables or directly from optical sources. Furthermore, it is understood that optical signals may be transmitted from the coupler into fiber optic cables or directly to optical detectors. However, the direct application of optical sources and detectors at any port or the coupler may result in the loss of bi-directionality. The deflecting surfaces of the deflecting elements are generally at approximately 45° relative to the direction of the respective optical signal. Efficiency may be enhanced of the application of appropriate optical coatings to improve optical reflectivity from the deflecting surfaces.

Figure 9:
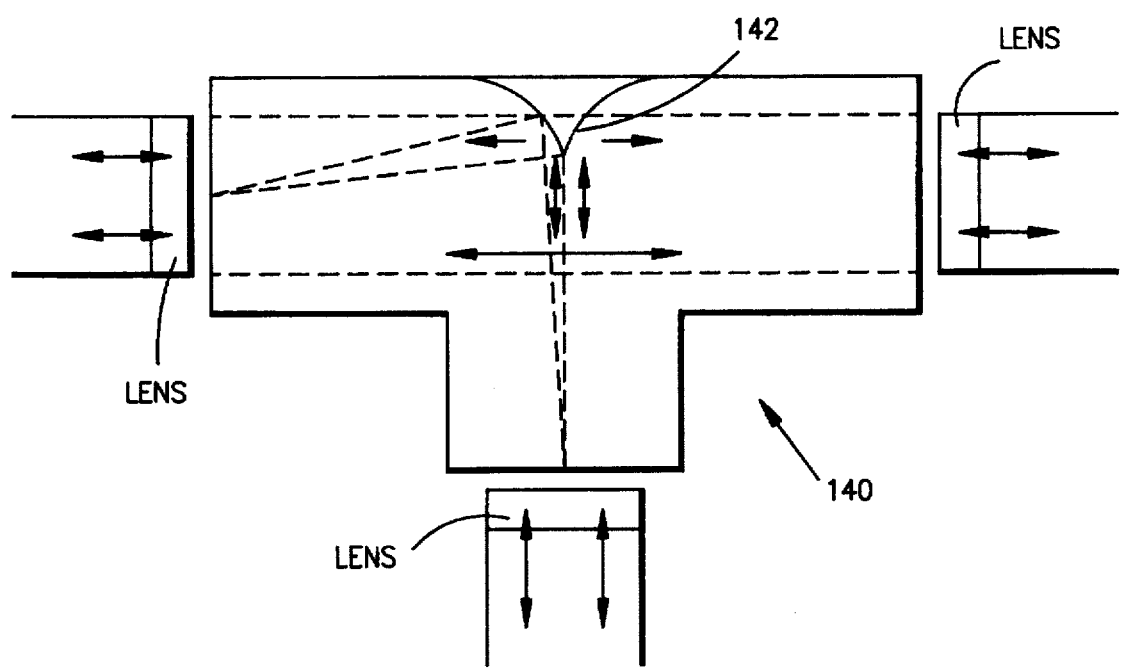
FIG. 9 is a functional, schematic diagram illustrating the use of a deflecting element with a curved surface.

The deflecting surfaces in all previous embodiments have been shown to be flat. However, as shown in the embodiment 140 of FIG. 9, the deflecting element 142 may include curved deflecting surfaces to further enhance control or focus of the deflected portion of the beam.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An optical coupler, comprising:
   a) a first port assembly for receiving a first optical signal, said first port assembly comprising a first lensing element;
   b) a second port assembly for emitting a predetermined transmitted portion of said first optical signal, said second port assembly comprising a second lensing element;
   c) a deflecting element positioned between said first and second port assemblies, said deflecting element providing deflection of any optical signals directed thereto solely by reflection; and,
   d) a third port assembly comprising a third lensing element,
      said deflecting element and said third port assembly being so positioned and arranged such that a deflected portion of said first optical signal is deflected from said deflecting element and directed through said third port assembly and said predetermined transmitted portion of said first optical signal is directed through said second port assembly without being deflected by said deflecting element, said transmitted and deflected portions of said first optical signal being expanded and collimated while passing through said optical coupler by appropriate positioning of said lensing elements to provide efficient and accurate control of said first optical signal.

2. The optical coupler of claim 1, wherein said second port receives a second optical signal, said second optical signal being directed through said first port assembly, no portion of said second optical signal being directed through said third port assembly.

3. The optical coupler of claim 1, wherein said third port assembly receives a third optical signal, said deflecting element being arranged and constructed to deflect a first deflected portion of said third optical signal, said first deflected portion of said third optical signal being directed through said first port assembly, no portion of said third optical signal being directed through said second port assembly.

4. The optical coupler of claim 1, wherein said second port receives a second optical signal, a first transmitted portion of said second optical signal being directed through said first port assembly and a second deflected portion of said second optical signal being directed through said third port assembly.

5. The optical coupler of claim 1, wherein said third port receives a third optical signal, a first deflected portion of said third optical signal being directed through said first port assembly and a second deflected portion of said third optical signal being directed through said second port assembly.

6. The optical coupler of claim 1, wherein said first optical signal is received from an optical source.

7. The optical coupler of claim 1, wherein said first optical signal is received from an optical fiber.

8. The optical coupler of claim 1, wherein said predetermined transmitted portion of said first optical signal is emitted to an optical detector.

9. The optical coupler of claim 1, wherein said predetermined transmitted portion of said first optical signal is emitted to an optical fiber.

10. The optical coupler of claim 1, wherein said deflected portion of said first optical signal is directed to an optical detector.

11. The optical coupler of claim 1, wherein said deflected portion of said first optical signal is directed to an optical fiber.

* * * * *

UNITED STATES PATENT AND TRADEMARK OFFICE
CERTIFICATE OF CORRECTION

PATENT NO. : 5,757,994
DATED      : May 26, 1998
INVENTOR(S): Schoenwald et al.

It is certified that error appears in the above-identified patent and that said Letters Patent is hereby corrected as shown below:

On the title page, item [54] and column 1,

"THREE-PART OPTICAL COUPLER"
should read "THREE-PORT OPTICAL COUPLER"

Signed and Sealed this

Twenty-seventh Day of October, 1998

Attest:

BRUCE LEHMAN

*Attesting Officer*   *Commissioner of Patents and Trademarks*